United States Patent [19]

Marshall et al.

[11] Patent Number: 4,966,562

[45] Date of Patent: Oct. 30, 1990

[54] SINGLE SLOT REPEATER MOUNTING

[75] Inventors: Loren M. Marshall, Dayton; William A. Wolfe, West Milton, both of Ohio

[73] Assignee: The Ohio Bell Telephone Company, Cleveland, Ohio

[21] Appl. No.: 240,964

[22] Filed: Sep. 6, 1988

[51] Int. Cl.⁵ .............................................. H01R 9/22
[52] U.S. Cl. .................................. 439/718; 174/52.1; 361/393; 379/338
[58] Field of Search ............... 379/296, 328, 330, 338; 361/393, 395, 396, 424, 426; 174/38, 52.1, 60; 439/607, 610, 620, 622, 717, 718, 76, 928

[56] References Cited

U.S. PATENT DOCUMENTS

| | | | |
|---|---|---|---|
| 1,302,137 | 4/1919 | Cook | 174/60 |
| 2,951,185 | 8/1960 | Buck | 439/59 X |
| 3,233,209 | 2/1966 | Lazar et al. | 439/724 |
| 3,258,649 | 6/1966 | Arguin et al. | 439/76 X |
| 3,302,160 | 1/1967 | Nielsen | 439/717 X |
| 3,991,288 | 4/1976 | George et al. | 379/338 |
| 4,080,028 | 3/1978 | Gilbert | 429/62 |
| 4,171,152 | 10/1979 | Geiseler | 439/752 |
| 4,174,147 | 11/1979 | Waddington et al. | 439/636 |
| 4,226,491 | 10/1980 | Kazama et al. | 439/76 |
| 4,304,453 | 12/1981 | Grunwald | 439/341 |
| 4,308,953 | 1/1982 | Cohen | 439/76 X |
| 4,388,010 | 6/1983 | Mott et al. | 439/81 X |
| 4,401,351 | 8/1983 | Record | 439/928 |
| 4,487,464 | 12/1984 | Kirschenbaum | 439/62 |
| 4,558,914 | 12/1985 | Prager et al. | 439/928 |
| 4,597,291 | 7/1986 | Motomiya | 361/395 X |
| 4,647,131 | 3/1987 | Van Woensel | 439/266 |
| 4,655,518 | 4/1987 | Johnson et al. | 439/62 |
| 4,688,864 | 8/1987 | Sorel | 439/74 |
| 4,692,120 | 9/1987 | Feinstein | 439/62 |

OTHER PUBLICATIONS

Special Product Company, two pamphlets each entitled "Repeater Housings" and price lists (1988).
Ci Network Products, "Ci-2000 Series Repeater Housing" (1988).

Primary Examiner—Neil Abrams
Assistant Examiner—Kheim Nguyen
Attorney, Agent, or Firm—Renner, Otto, Boisselle & Sklar

[57] ABSTRACT

A mounting for a digital service line repeater comprises a housing having a base and a removable cover, electrical components for electrically connecting the line repeater to signal wires, and a fastening device for removably attaching the base of another mounting to the removable cover. The fastening device includes a threaded hole in the cover for receiving a fastener, and the base includes an aperture aligned with the threaded hole for receiving a fastener. The mounting can be stacked on and mounted to a second similar mounting by a fastener passing through the aperture in the base for receipt in the threaded hole in the cover of the second mounting. The cover is removably attached to the base by accessible fasteners at the side walls, and the base includes a slot for receiving the line repeater. The electrical components include an electrical connector at one end of the slot for electrically connecting with the line repeater, and an easy connect wire connector having clamping terminals for electrically and mechanically connecting with signal wires.

12 Claims, 3 Drawing Sheets

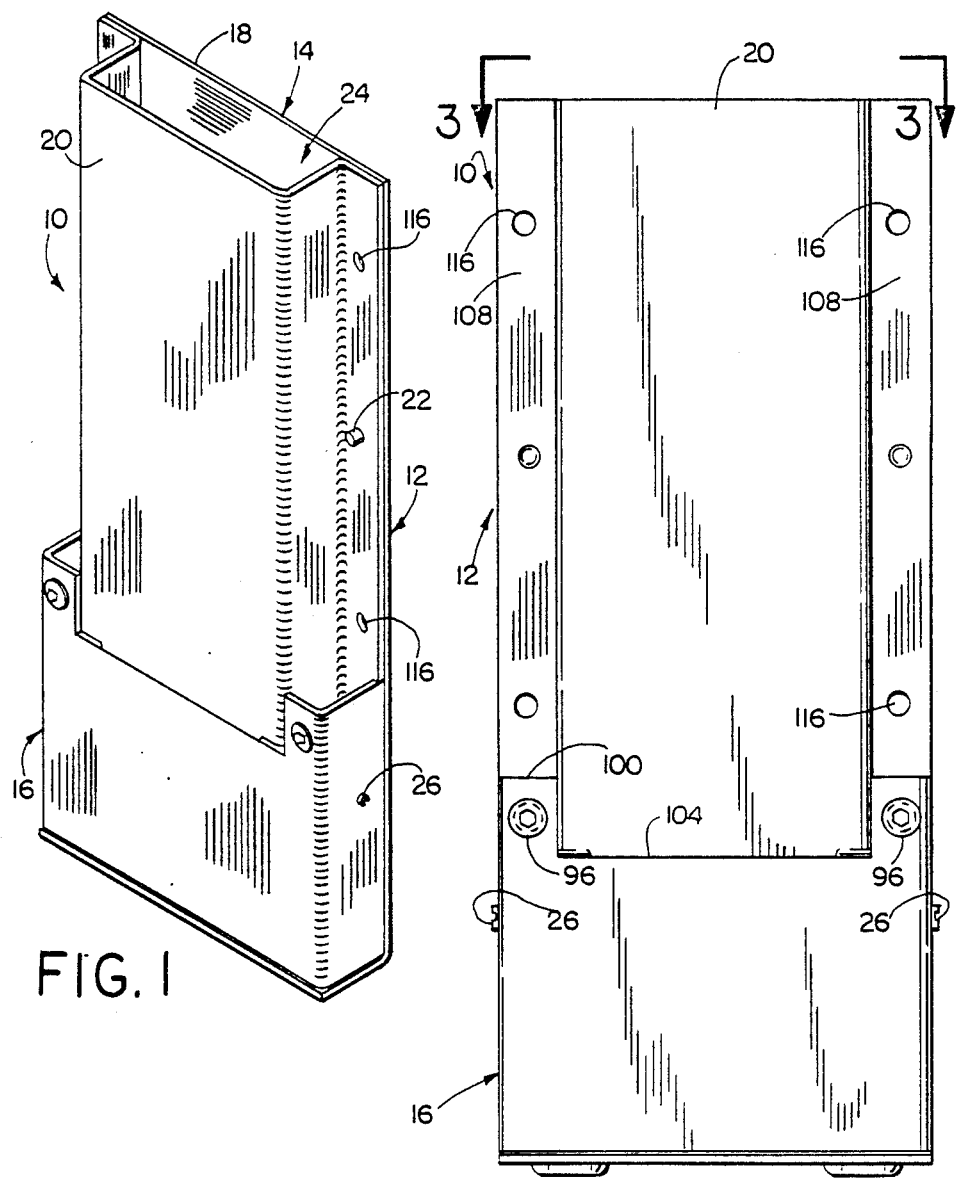
FIG. 1
FIG. 2
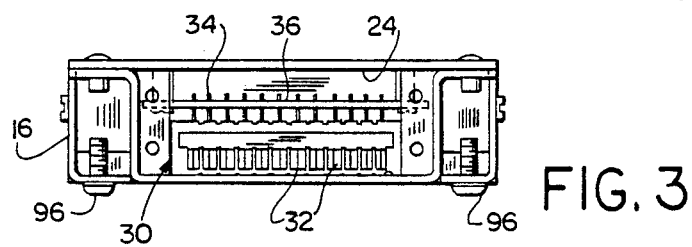
FIG. 3

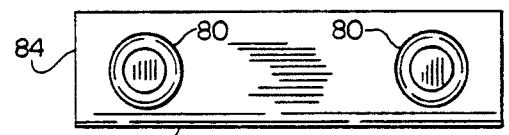
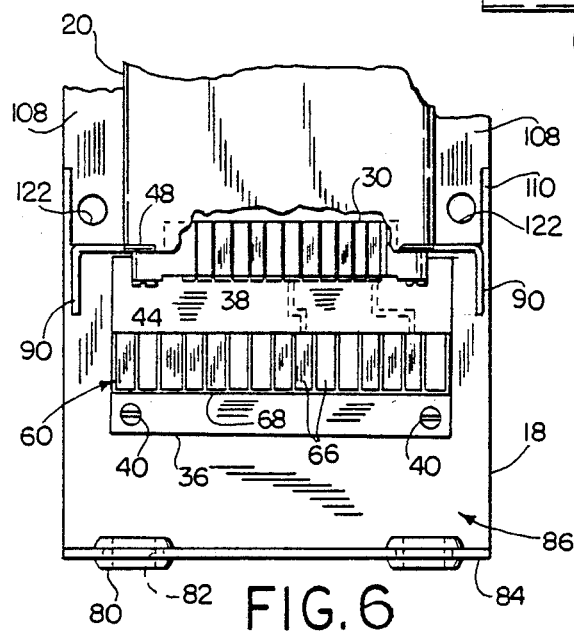
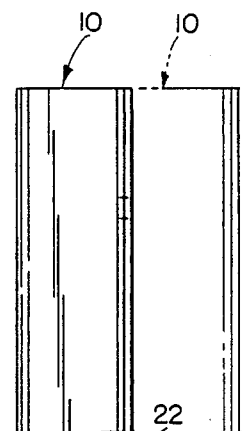
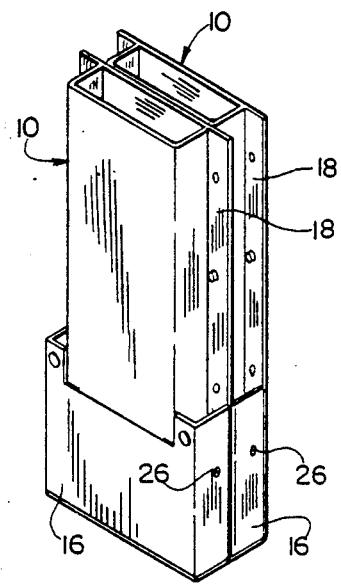
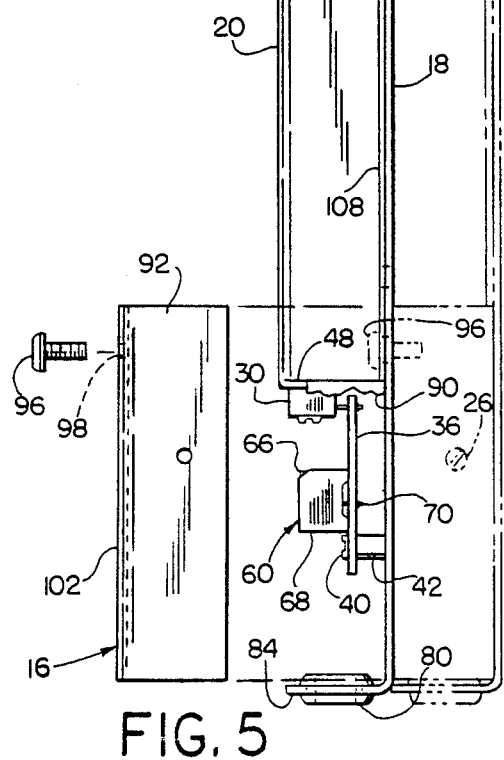

SINGLE SLOT REPEATER MOUNTING

DISCLOSURE

The invention herein disclosed relates generally to T-carrier communication systems and, more particularly, to a mounting for a pulse coded modulation (PCM) line repeater which is used in T-carrier communication systems for regeneration of PCM signals.

BACKGROUND OF THE INVENTION

T-carrier communication systems are well known and are in common use by telephone companies for voice or data transmission. Such systems employ pulse coded modulation to transmit digitized voice or data signals. Telephone companies presently are offering one or more types of digital service including 1.544 Megabit per second T1 digital service and 3.1520 Mega-bit per second T1C digital service.

Because of the high frequency involved, the carrier signal (pulse train) attenuates rapidly. For example, the T1 signal typically can only be transmitted a maximum of approximately 6,000 feet before having to be regenerated by a line repeater. Accordingly, a telephone company may need one or more line repeaters between its central office and the customer location to maintain a desired level of the carrier signal.

Heretofore, apparatus cases were used to house the line repeaters. These cases could house a plurality of line repeaters for multiple T1 lines. The apparatus cases were water-tight and provided needed protection for the line repeaters when located in manholes where the cases often were under water. To facilitate in-line connection of the repeaters, repeater connectors in the cases were wired with cable stubs that extended outside the case for splicing into the T1 lines.

However, from time to time, there would be a need to install one or just a few line repeaters at a particular location, such as at the customer site. Heretofore, it was a common practice to install the line repeater or repeaters in an apparatus case at substantial cost for both the case and installation. Moreover, the relatively large and bulky apparatus case took considerable space in oftentimes cramped or confined areas.

SUMMARY OF THE INVENTION

The present invention provides a mounting for a digital service line repeater. The mounting is a relatively inexpensive, compact and easy to use substitute for the above discussed apparatus case previously used to house line repeaters. This results in a substantial cost saving.

According to one aspect of the invention, a line repeater mounting comprises a housing having a base and a removable cover, electrical components for electrically connecting the line repeater to signal wires, and a fastening device for removably attaching the base of another mounting to the removable cover. Preferably, the fastening device includes a threaded hole in the cover for receiving a fastener, and the base includes an aperture aligned with the threaded hole for receiving a fastener. Accordingly, when the mounting is stacked on and aligned with a second similar mounting, a fastener may be passed through the aperture in the base for receipt in the threaded hole in the cover of the second mounting, thereby to secure the base to the cover of the second mounting.

In a preferred embodiment, the cover has a front wall and side walls, and the cover is removably attached to the base by fasteners at the side walls, such as screw fasteners passing through apertures in the side walls for engagement in a threaded hole in the base. The base includes a slot for receiving the line repeater and the electrical components include an electrical connector at one end of the slot for electrically connecting with the line repeater. The electrical components also include an easy connect wire connector having clamping terminals for electrically and mechanically connecting with signal wires, and the base and cover together form an enclosure for the easy connect wire connector. The base has a bottom wall forming a part of the enclosure, and the bottom wall includes at least one aperture for passage of the signal wires into the enclosure.

Further in accordance with the invention, multiple mountings can be stacked with the backs of the housings in juxtaposition with the front of the housing of the next adjacent and lower mounting. The mountings are attached to adjacent mountings by respective fastening devices preferably to the cover of the next lower housing, and the fastening devices are accessible to permit disassembly of the stack at any one mounting without requiring removal of other mountings stacked above the selected mounting.

According to another aspect of the invention, a line repeater mounting comprises a housing including a base and an openable and closable cover. The cover when closed cooperates with the base to form an enclosure. A line repeater connector is mounted to the base for electrically connecting with the line repeater, and a wire connector is mounted to the base and contained within the enclosure for electrically and mechanically connecting with signal wires. The wire connector is electrically connected to the line repeater connector, and apertures are provided for permitting passage of signal wires into the enclosure when the cover is closed. Preferably, the wire connector is mechanically actuable to secure and unsecure signal wires with respect thereto.

The foregoing and other features of the invention are hereinafter fully described and particularly pointed out in the claims. The following description and the annexed drawings set forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a perspective view of an electrical housing in accordance with the present invention;

FIG. 2 is a front elevation of such electrical housing on a somewhat enlarged scale;

FIG. 3 is a view taken along lines 3—3 of FIG. 2;

FIG. 4 is a bottom plan view of the housing;

FIG. 5 is a side elevation of two electrical housings connected together in stacked relationship, the lower cover of one unit being exploded and the second unit being shown in phantom lines;

FIG. 6 is a fragmentary front elevational view of the lower portion of the electrical housing with the bottom cover removed and a portion of the top cover being broken away;

FIG. 8 is a perspective view, on a somewhat diminished scale, of two of the electrical housing units oriented in stacked relation.

DETAILED DESCRIPTION

Figure 7:
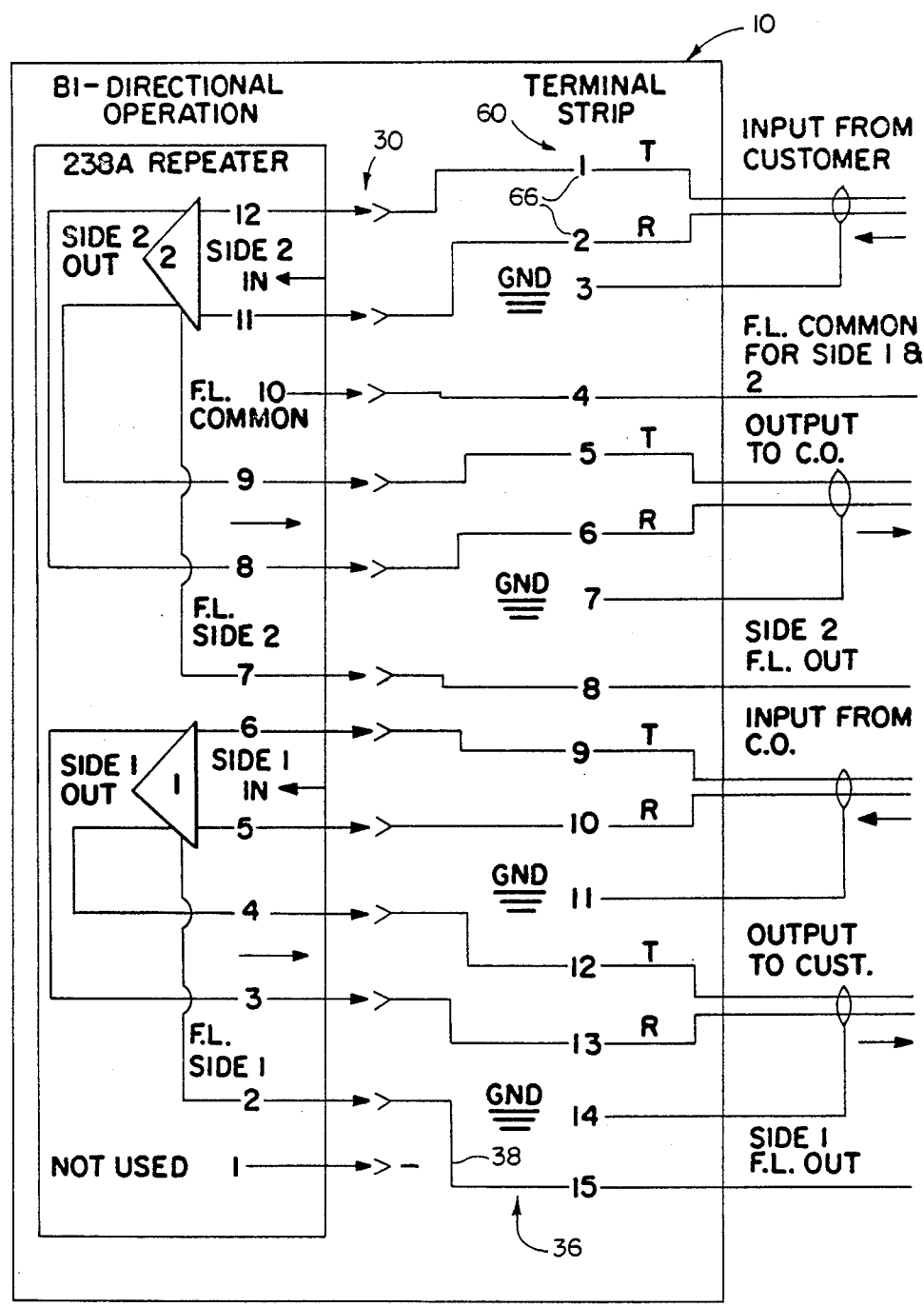
FIG. 7 is a schematic diagram of the type of circuitry which may be accommodated by the housing.

Referring now initially to FIGS. 1 and 2, a repeater mounting according to the present invention is indicated generally at 10. The repeater mounting 10 comprises a housing 12 which includes a housing base 14 and a lower housing cover 16. The housing base 14 includes a back plate 18 to which an upper housing cover 20 is fixedly attached by rivets 22. The upper housing cover 20 forms with the back plate 18 an upper housing area or slot 24 for receiving a line repeater such as a conventional T1 line repeater. The slot 24 generally is rectangular in cross-section for accommodating the T1 line repeater which, in general, includes a printed circuit board carrying various electrical components for performing the signal regeneration function of the line repeater, as is known to the art. The circuit card commonly is housed in a rectangular casing and the slot 24 would be correspondingly sized.

A preferred material for the back plate 18 and upper housing cover 20 is aluminum because of its ease of fabrication, light weight and electromagnetic frequency (EMF) shielding properties. For the same reasons, the lower housing cover 16 also preferably is made of aluminum.

The lower housing cover 16 normally is secured to the housing base 14 by screw fasteners 26, one being provided at each side of the lower housing cover. As will be appreciated, the screws 26 can be easily accessed and removed to permit removal of the lower housing cover to gain access to internal electrical components.

Referring now to FIGS. 3, 5 and 6, the repeater mounting further comprises a female connector 30 for mating with a standard male connector of a line repeater. In the illustrated embodiment, the connector 30 is of conventional type and comprises a plastic body including a slot for receiving the male connector of a line repeater. Extending in a row along one side of the slot are contacts 32 for electrically connecting with respective electrical terminal elements of the line repeater in known manner. The contacts 32 have solder tails 34 soldered to respective traces on the back side of a printed circuit board 36. Only a few of the traces on the back side of the printed circuit board 36 are depicted by broken lines seen at 38 in FIG. 6.

The circuit board 36 is mounted at its lower end to the back plate with screw fasteners 40 which pass through spacers 42. The circuit board is supported at its upper end by the thereto soldered tails of the contacts 32. The contacts 32 in turn are supported in the connector body which is secured at its outer ends by screw fasteners 44 to respective ears 48 which extend from the upper housing cover 20.

The printed circuit board 36 has mounted thereon a wire terminal or connector block 60. In the illustrated embodiment, the terminal block 60 is of a conventional easy connect type employing a row of lever actuated cam connectors 66. Although not illustrated, the wire connectors include contact elements having contact arms which face each other and which are pressed towards one another by a cam surface on the corresponding lever arm. When thusly pressed together, the contact arms bite into a wire conductor inserted therebetween to effect electrical connection and also a strong mechanical connection preventing separation of the wire conductor from the terminal block. As viewed in FIGS. 5 and 6, the terminal block has along its bottom side 68 a row of openings through which wire conductors may be inserted into the terminal block for electrical and mechanical connection to respective wire connectors 66.

The wire connectors, or more particularly the contact elements thereof, have respective solder posts 70 for electrically connecting and mechanically mounting the terminal block 60 to the printed circuit board. The solder posts are soldered to respective traces on the back side of the printed circuit board. The printed traces provide for routing of signals from the contact elements of the terminal block to respective contacts 32 of the card edge connector 30. The routing assignment of the printed traces is shown in FIG. 7.

The mounting may be wired to shielded single pair wire or shielded multi-pair cable. If multi-pair cable is used then the transmit and receive lines should preferably be in separate cables. In either case, the cable should be grounded at one end only to prevent ground loops.

The cables (not shown) for the incoming and outgoing lines are brought into the lower housing area through spaced apart grommets 80. The grommets 80 are contained in apertures 82 in the bottom wall 84 of the housing. The bottom wall 84 is formed by bending the lower edge portion of the back wall 90° C. in a forward direction. The apertures 82, as seen in FIG. 4, are laterally spaced and permit passage of the service cables and optionally other conductors into and out of the lower housing portion or area of the housing.

The lower housing area, indicated at 86, and its contents are protected by the lower housing cover 16 which bridges and forms part of the lower portion of the housing. As above indicated, the lower housing cover is removably secured to the housing base by fasteners 26. More particularly, the fasteners 26 secure the lower housing cover to tabs 90 formed by downwardly bent end portions of the ears 48 extending from the upper housing cover 20. As can be seen, the fasteners 26 which pass through side walls 92 of the lower housing cover are accessible at the sides of the lower housing cover.

The lower housing cover 16, as seen in FIGS. 2 and 5, is further provided with screw fasteners 96 which are received by tapped apertures 98 in upwardly extending housing cover ears 100. The ears 100 and front wall 102 of the lower housing cover define a cut-out 104 which accommodates a corresponding lower end portion of the upper housing cover 20. The lower cover ears are supported by the complementally extending integral side walls 92 of the lower housing cover. The side walls 92 and, in turn, the ears are further supported by the lateral extension of the edge flanges 108 of the housing base. The upper housing cover at the edge flange portion may be notched as seen at 110 in FIG. 6 to receive the side walls 92 of the lower housing cover, which then would bear against the back plate 18. This arrangement serves as an aid in seating and supporting the lower housing cover.

The mounting is generally secured to a support structure such as a backboard or service wall by employing suitable connectors (not shown) which pass through apertures 116 in the side flanges 108 of the housing base. More particularly, the housing is secured at its base portion to a suitable support structure by connectors such as screws passing through the mounting holes 116. Service cables could then be run through the grommets 80 and, as needed, grounded to the case by connection of their ground or shield drain wires to wire connectors 66 grounded to the housing.

In the illustrated embodiment, the grounded wire connectors are connected to a grounding strip trace on the back side of the printed circuit board 36 which overlaps and electrically connects with the spacers 42 which are electrically connected to the housing. As seen in FIG. 7, wire connectors 66 numbered 3, 7, 11 and 14 of the terminal block 60 are assigned to ground.

The assignments of the other wire connectors 66 also can be seen in FIG. 7. These other wire connectors may have the input and output lines connected thereto as indicated to provide for appropriate routing of signals via the conductive paths on the printed circuit board 36 and the connector 30 to the line repeater inserted into the slot 24 to mating engagement with the connector 30. FIG. 7 shows an assigment for bi-directional operation using a 238a T1 line repeater. Conventionally, side one input is usually connected to the line from the central office or a controlled environmental vault in the case of telephone company installations. Side one out then becomes the customer receive. Consequently, side two input is connected to the customer transmit and side two output is connected to the transmit cable pair back to the central office directly or via one or more controlled environmental vaults.

Preferably, fault locate lines are connected to the indicated terminals when the repeater selected has fault locate capability. Typically, the fault locate lines would be routed to an externally mounted fault locate filter that may be shared by any number of repeaters mounted in their own repeater mountings. The illustrated mounting provides for connection of a fault locate line for each side of the bi-directional repeater.

After all connections have been made to the terminal block 60 the lower housing cover 16 is then secured to the housing base 14. Thus, the lower housing area 86 is enclosed and the various electrical connections and components therein are appropriately shielded. Of course, at any time an appropriate repeater can be inserted into the upper housing slot 24 for connection to the connector 30.

According to a particularly novel aspect of the invention, additional line repeater mountings may be attached to the first repeater mounting in stacked relationship, as may be needed when more than just one repeater is needed or as additional repeaters are needed at a later time. The second mounting can be simply attached by screws 96 passing through mounting apertures or holes 122 in the housing side flanges 108 and into the threaded holes 98 in the ears 100 of the lower housing cover 16. With the illustrated mounting, the lower housing cover of the second mounting may be removed to gain easy access to the mounting apertures 122. With the screw fasteners 98 secured in place, the housing base of the second mounting will be secured to the lower housing cover of the first mounting. The second mounting can then be wired as above described and then the lower housing cover of the second mounting may be secured to the housing base of the second mounting. The stacked assembly is seen in FIGS. 5 and 8.

In similar manner, a third mounting can be stackably secured to the second housing, and then a fourth, and so on. It further is noted that regardless of the number of mounting stacked one atop the other, easy access can be had to the lower housing area of any one of the mountings by simply removing the lower housing cover for the selected mounting. This is effected by removing the side accessible screw fasteners 26 holding the lower housing cover to the housing base of the selected mounting. Once the screw fasteners 26 have been removed, the lower housing cover can be separated from the corresponding housing base carrying with it all the other mountings that are stacked atop or outwardly of the mounting to which access is desired. This also permits removal of the selected mounting or, more particularly, a housing base and a lower housing cover. That is, the lower housing cover for the mounting immediately underlying the selected mounting may be removed from its housing base, taking with it the housing base for the mounting to be removed. The lower housing cover to which the outermost mountings are fastened directly or indirectly then becomes the lower housing cover for the underlying mounting which is fastened directly or indirectly to the service wall, backboard, or the like.

With an appreciation of the scope of this invention one can readily acknowledge the substantial cost saving this invention affords over the bulky apparatus cases that have been used in the past. The units of the instant invention are stackable and easily wired since easy connect terminals are used. The housing provides desired shielding for the repeater circuit therein, it being noted that preferably the housing surrounds the repeater over the full length of the repeater. Accordingly, the unit is fully shielded except at the open top and the bottom of the slot 24 which is closed by the connector 30. As will be appreciated, the line repeater preferably is mounted between a cable protector and the demarc block in conventional service installations at a customer's site. The unit is fully compatible in that it can handle both protected and non-protected repeaters in addition to unidirectional and bi-directional repeaters, as will be appreciated by those skilled in the art.

As will further be appreciated, the mounting, because of its light weight and compact size, can be readily transported to a job site and installed in a matter of minutes, thereby minimizing installation delays previously associated with apparatus cases.

It will also be appreciated that the illustrated line repeater mounting is designed to accommodate a single repeater, however, it may vary somewhat in configuration from that described without departing from the intention and scope of the invention. It will also be appreciated that there is provided a system for collating a number of physically similar subassemblies. In the embodiment described, the subassemblies are not only dimensionally similar, but comprise repeater boards that are electrically similar as well.

Although the invention has been shown and described with respect to a certain preferred embodiment, equivalent alterations and modifications will occur to others skilled in the art upon the reading and understanding of this specification. The present invention includes all such equivalent alterations and modifications and is limited only by the scope of the following claims.

What is claimed is:

1. An assembly comprising at least two communication line repeater mounting devices, each said communication line repeater mounting device comprising housing means for housing a communication line repeater, said housing means including a base and a front cover, cover fastener means for removably attaching said cover to said base, and electrical means in said housing means for electrically connecting the communication line repeater to signal wires; first base fastener means for attaching the base of a first one of said mounting devices to a support independently of said cover fastener means, and second base fastener means for fastening the base of a second one of said mounting devices to the cover of said first one of said mounting devices independently of said cover fastener means and said first base fastener means, whereby the cover of said first one of said mounting devices is removable from the base of said first one of said mounting devices while said base of said first one of said mounting devices remains fastened to the support and the base of said second one of said mounting devices remains fastened to the cover of said first one of said mounting devices.

2. An assembly as set forth in claim 1 wherein, with respect to each one of said mounting devices, said housing means has a front, back and sides; said cover when attached to said base cooperates with said base to form a first housing area at one end of said base; said housing means has a second housing area at an opposite end of said base for receiving a communication line repeater; and said electrical means includes repeater connector means mounted to said base for electrically connecting with the communication line repeater, and wire connector means mounted to said base and contained within said first housing area for electrically and mechanically connecting with signal wires, said wire connector means being electrically connected to said repeater connector means, and said housing means having means for permitting passage of signal wires into said first housing area from outside said housing means when said cover is attached to said base.

3. An assembly as set forth in claim 2, wherein said cover fastener means of each one of said mounting devices is disengagable at least one side of said housing for effecting detachment of said cover from said base.

4. An assembly as set forth in claim 2, wherein said second housing area of each one said mounting devices is a slot having an open end for insertion of a communication line repeater into said slot.

5. An assembly as set forth in claim 2, wherein said base of each one of said mounting devices includes a back plate having first and second portions and means fixed to said back plate and cooperating with said second portion to form said second housing area, and said cover cooperates with said first portion to form said first housing area.

6. An assembly as set forth in claim 1, wherein said cover of said first one of said mounting devices includes means for receiving a fastener, and said base of said second one of said mounting devices includes an aperture aligned with said means for receiving a fastener.

7. An assembly as set forth in claim 1, wherein said cover of said first one of said mounting devices has a front wall and side walls, and said cover fastener means includes fastening means for removably attaching said cover of said first one of said mounting devices at the side walls thereof to said base of said first one of said mounting devices.

8. An assembly as set forth in claim 1, wherein said base of each one of said mounting devices includes a slot for receiving a communication line repeater and said electrical means of each one of said mounting devices includes electrical connector means at one end of said slot for electrically connecting with the communication line repeater.

9. An assembly as set forth in claim 1, wherein said electrical means of each one of said mounting devices includes an electrical connector having clamping terminals for electrically and mechanically connecting with signal wires.

10. An assembly as set forth in claim 9, wherein said base and cover of each one of said mounting devices together form an enclosure for said electrical means.

11. An assembly as set forth in claim 10, wherein said base of each one of said mounting devices includes wall means forming a part of said enclosure, and said wall means includes at least one aperture for passage of signal wires into said enclosure.

12. An assembly as set forth in claim 9, wherein said clamping terminals of each one said mounting devices include lever actuated cam connectors.

* * * * *